United States Patent [19]

Kohaut

[11] 4,010,314

[45] Mar. 1, 1977

[54] INSERT DEVICE FOR CABLES

[75] Inventor: John E. Kohaut, West Orange, N.J.

[73] Assignee: Raceway Components, Inc., Nutley, N.J.

[22] Filed: Aug. 15, 1974

[21] Appl. No.: 497,551

[52] U.S. Cl. .................................................. 174/48

[51] Int. Cl.² .......................................... H02G 3/12

[58] Field of Search ................. 174/48, 49; 52/220, 52/221

[56] References Cited

UNITED STATES PATENTS

| | | | |
|---|---|---|---|
| 3,417,191 | 12/1968 | Fork | 174/49 |
| 3,592,956 | 7/1971 | Fork | 174/49 |
| 3,609,210 | 9/1971 | Guritz | 174/49 |
| 3,676,568 | 7/1972 | Fork | 174/49 |
| 3,683,101 | 8/1972 | Liberman | 174/49 |
| 3,701,837 | 10/1972 | Fork | 174/49 X |
| 3,721,051 | 3/1973 | Fork | 174/49 X |
| 3,751,576 | 8/1973 | Klinkman et al. | 174/48 |

*Primary Examiner*—Bruce A. Reynolds
*Assistant Examiner*—David A. Tone
*Attorney, Agent, or Firm*—Sommers & Sommers

[57] ABSTRACT

This invention relates to an insert device adapted to be positioned in structural openings, as, for example in holes or openings formed in cellular raceways for connection of cables such as power and telephone lines, from a source and into the insert device for connection with fixtures, phones and other devices. The insert device is adapted to be manufactured in preset form to be positioned relative to raceway structures such as cellular raceways, the cement or other floor forming materials being poured thereover; a cap seals the insert device and is adapted to be removed when it is desired to use the insert device.

14 Claims, 5 Drawing Figures

54
52
50
56
54
56
20
16
42
42
15
23
21
17
18
19
24
22
32
39
33
31
30
39
38
36
26
55
53
55
51
43
35
57
57

38
36
38
26
38
27
43
37
35
35

65
64
63
66
15
70
44
24
29
67
62
28
26
27
60
60
60
30
61
38
58

INSERT DEVICE FOR CABLES

BACKGROUND OF THE INVENTION

This invention generally relates to cable conduit devices and more particularly to inserts for use in connection with floors and the like for passage of cables from raceways through the insert device for convenient connection of telephone, electrical and other apparatus thereto. The insert assembly of the invention is designed for rapid, foolproof installation, without necessitating use of tools or special dexterity and is so designed and of such structural features as to provide automatic safeguards against installing it incorrectly.

INSTALLATION OF THE INVENTION

Installation of the device is simply achieved by positioning two side members thereof in perpendicular interfitting registry with the cable raceways and with cell openings in the raceways positioned therebetween. The insert side members lock securely in place and preclude vertical movement, thereby creating a walled channel between the cellular cable raceways wherein the insert top and bottom assemblies may readily be received, forming an interlocking and immobilized device. The insert top assembly may be secured to the insert bottom by press-on clips or other interengaging means. The assembly is securely connected to the cellular raceway which, in turn, is attached to the floor; thus, essentially the insert device of this invention becomes part of the building structure. The general contractor or deck manufacturer may turn over the inserts of the invention to the electrical contractor to install in the field. The necessity for critical tolerance of cell alignment and openings, as required in devices provided heretofore, is obviated by the structure of the invention without the necessity, as in previous structures, of installing such inserts with use of swedging tools, pop-rivets, sheet metal screws and, sometimes, the necessity for drilling holes in the field. Such prior devices also often further required grommeting of openings and, sometimes, welding. Heretofore the electrical contractor would drill a hole in the top of the cellular raceways, in the field, to mount the devices on them, and, after he drilled the hole, he would swedge it on top and rivet or in some other way mechanically attach it to the cell. Deck manufacturers found that procedure objectionable as structurally unsound; the objections are obviated by the device of the invention wherein entrance into the raceways is through the sides thereof; the invention was further designed to provide a simple and fast way of installing inserts for pulling telephone, electrical cables and the like through openings in the sides of the cellular raceways while protecting the same. As noted above, the device of this invention is installed without tools, and structural self-grommeting is provided therein; sharp edges are also eliminated so that, when the contractor or phone company pulls cables or wires through the openings of the cellular raceways and the insert device, they will not be damaged. The structural features of the device further serve to assure inherent stability and substantial structural strength and make it essentially concrete tight. The device may be readily stamped and fabricated in standard form in quantities and knock-outs, as required, may be provided to faciliate use of the device.

To activate the insert after the concrete has been poured and set, it is merely necessary to tap out the concrete or other covering over the insert cap and remove the cap. When the concrete is poured, after positioning the device on the cellular raceways, the concrete will make even stronger and more waterproof, as it pushes on the structure. After the concrete hardens and the contractor wants to activate a cell he merely locates it by conventional methods, taps out the concrete and removes the cap; now looking into the insert top, the contractor can readily move the wires through the openings. The device provides automatic separation of power and telephone lines as required by Underwriters Laboratories and is formed to isolate the power cable from the telephone section thereof so that the telephone installers would be operating in a section separate from that of the power lines installers for increased safety.

DESCRIPTION OF THE DRAWINGS

The invention is diagramatically illustrated by way of example in the appended drawings, wherein:

FIG. 5 is a reduced scale, perspective view, of the device, shown positioned in a cable raceway structure mounted in a floor, shown fragmentarily.

DESCRIPTION OF A PREFERRED FORM OF THE INVENTION

Figure 1:
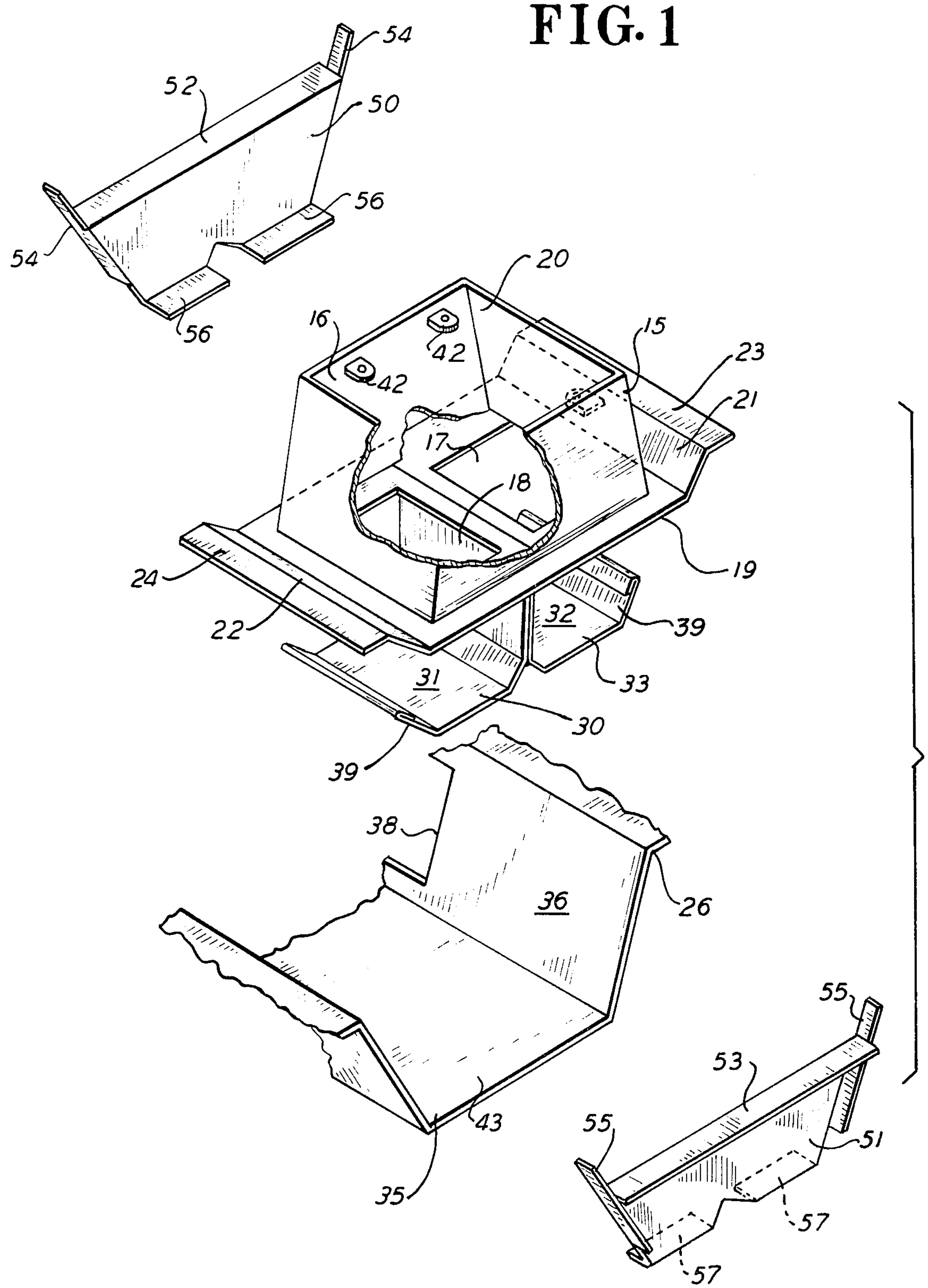
FIG. 1 is a partly sectional, perspective, exploded view of the insert device of the invention.

As shown in the drawings, the device comprises (FIG. 1) an insert top assembly 15, formed with opening 16 at the top thereof and openings 17 and 18 in the plate portion 19 at the bottom thereof. The latter may be formed to extend marginally beyond the side wall 20 of the insert top assembly and may be provided with upwardly directed longitudinal ends 21, 22, terminating in outwardly directed flanges 23, 24 which, on assembly of the device (FIG. 3) complementarily engage and register with the corners 26, 27, (FIG. 3) of the cellular raceways in connection with which the insert device is to be used.

Figure 2:
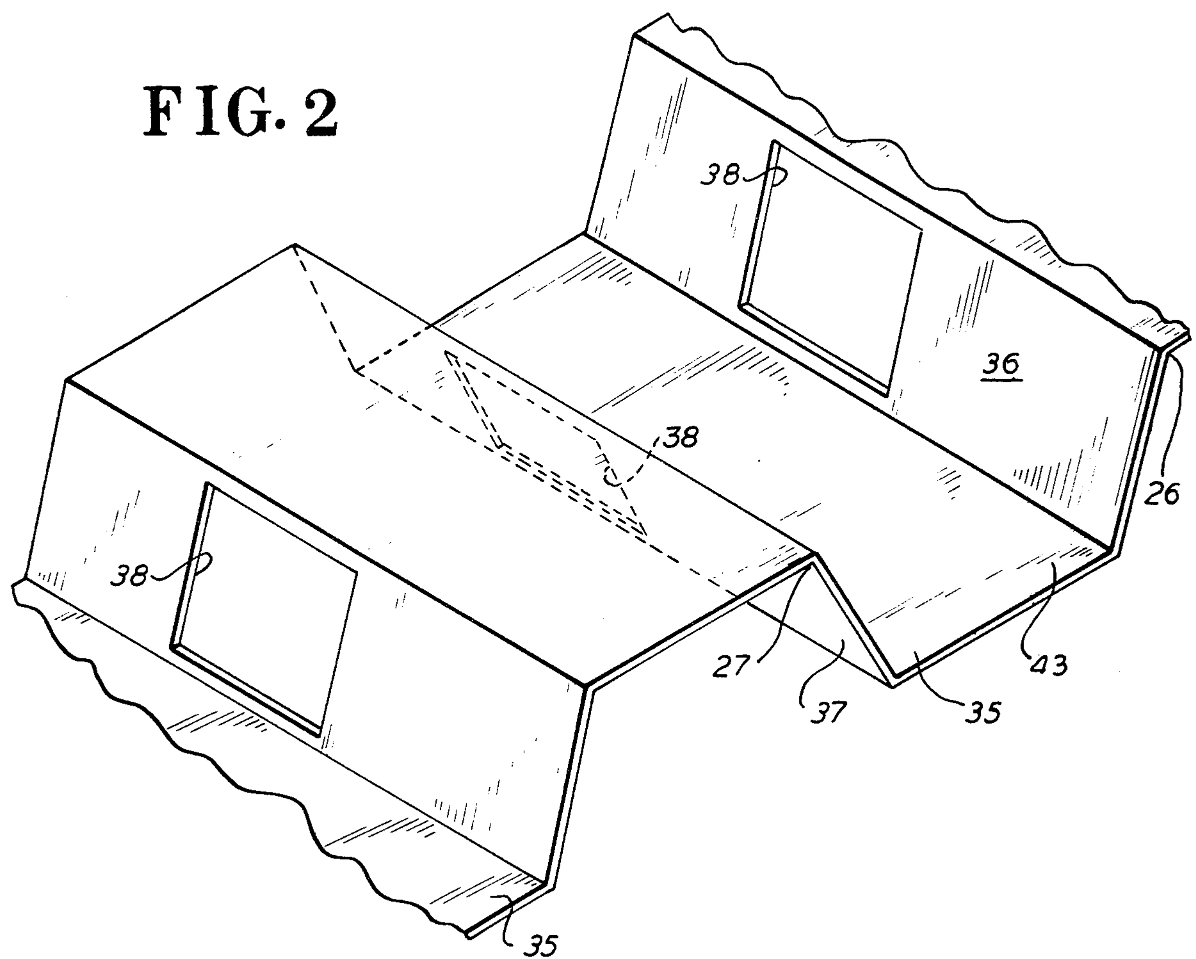
FIG. 2 is a fragmentary, perspective view of the cellular raceway cable source means in connection with which the invention may be used, shown provided, in the sides of the spaced walls thereof, with openings for registration of the device of the invention therewith.
Figure 3:
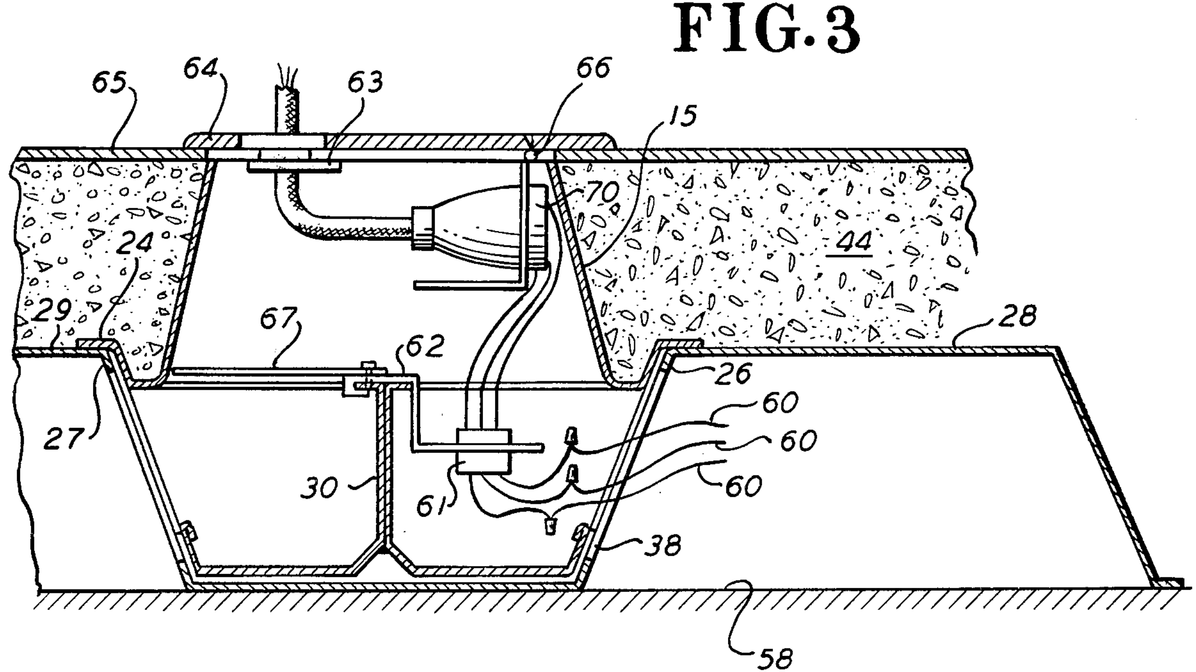
FIG. 3 is a fragmentary, sectional, elevational view of an insert device embodying the invention, shown positioned on a cable source and showing, fragmentarily, a cable source in connection with which it may be used.

The insert bottom assembly 30 (FIG. 1) is of preferably a generally inverted "T" shaped structure and may be formed of two separate "J" shaped members 31 and 32 secured together by welding or other suitable means to define a medial, cable-separating or compartmentalizing partition and having bottom portions 33 for registration with the bottom portions 43 of the cable raceways 35 (FIS. 1, 2, 5). The cable raceways are provided (FIGS. 1, 2) with side walls 36, 37 having openings 38, thereinto, facilitating use of the insert device in connection therewith. The bottom portions 33 of the bottom assembly of the device are upwardly outwardly inclined, as at 39 (FIG. 1) and define the outer ends of the flat bottom portion; they are preferably lipped or grommeted as shown in FIGS. 1 and 3 and are proportioned so that they will register with or just above the lower edges of the openings 38, in the side walls of the raceways, to provide grommeted surfaces over which the cables may be passed through the raceways on assembly and use of the insert device.

Figure 4:
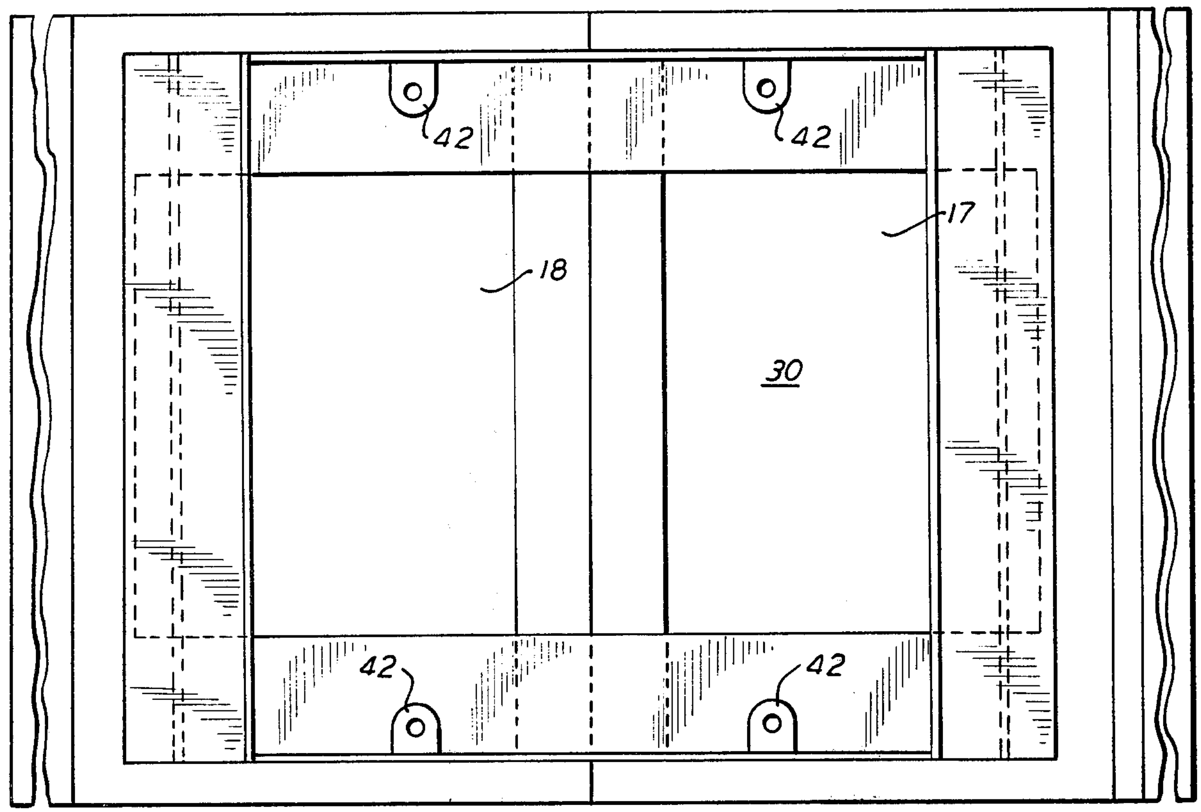
FIG. 4 is a top plan view of the assembled device.
Figure 4:
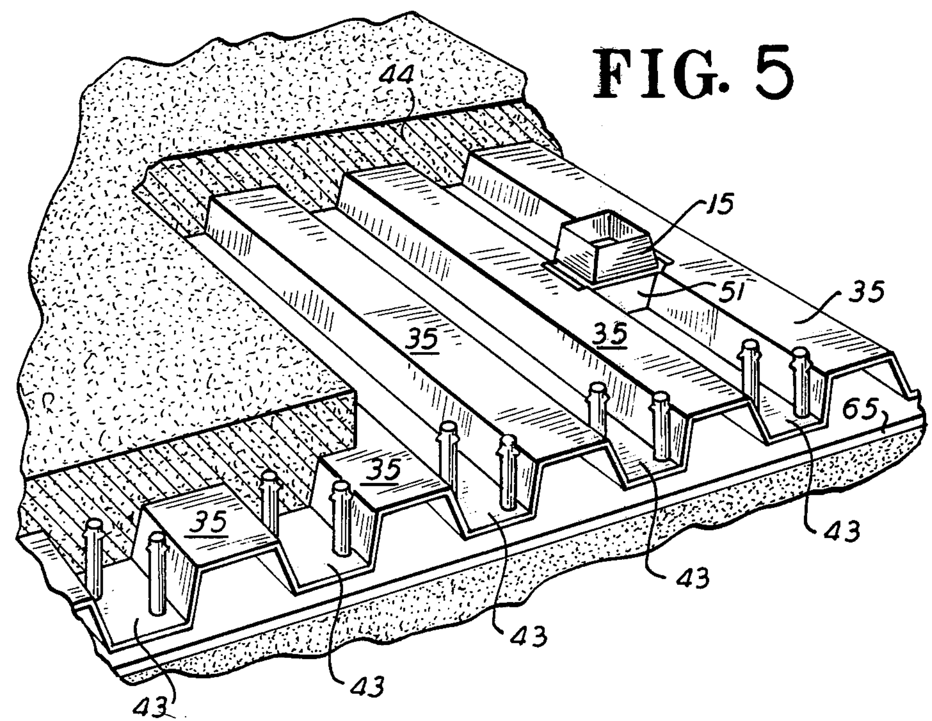

The device, on assembly, may be provided with a cap secured by a suitable interengaging or holding means, such as studs or the like 42 (FIGS. 1, 4) on the side wall 20 of the insert.

The insert device also comprises a pair of wedge-shaped insert sides 50, 51 (FIG. 1) preferably tapered upwardly outwardly or formed otherwise complementarily to the cable raceway sides and bottoms and provided with angularly extending flanges 52, 53 at the upper ends thereof and with said flanges 54, 55 and bottom flanges 56, 57.

In operation, the insert sides are positioned in the generally "V" shaped opening (FIGS. 2 and 3) defined between adjacent side walls 36, 37 and bottom of cellular cable raceways. The flanges 54, 55 facilitate sliding the insert sides 50, 51 into that position; the insert bottom assembly 30 is positioned (FIG. 3) between the insert sides 50, 51 and onto the bottom wall 43 intermediate the side walls 36, 37 of the cable raceway, in snug interfitting engagment with the bottom flanges 56, 57 of the insert side members 50, 51. The insert top portion assembly 15 is (FIGS. 1 and 3) positioned atop the insert bottom assembly and so assembled in registry (FIG. 3) with the corners 26, 27 of the sidewalls of the raceways. A cap member may be secured to the securing members 42 (FIG. 1), closing and sealing the device, and cement or other material defining the floor or other structure 44 is poured onto suitable forms or other floor support to form the same. The device is then "pre-set". Thereafter, as above described, the insert device may be located by the contractor and the cap removed and the cables passed through the openings 38 (FIG. 2) of the cable raceways and through the separating partitioning openings 17 and 18 (FIG. 1) of the insert device and thence upwardly for connection with telephones and other apparatus with which the cables are to be connected.

An example of one means for so doing, without limitation thereto, is shown in FIG. 3, wherein the cables or wires 60 are passed through the opening 38 in the cable raceway 28 and are suitably spliced to a cable fixture 61, which may be secured, as by a plate 62 mounted by suitable screws or the like, in the device. The wires or cables 60 may be connected by a plug or other means 70 to a wire or cable passing through a suitable grommet 63 in a plate 64 which may be secured atop the insert device or to the floor or other structure 65. The plate 64 may be hinged as at 66 to facilitate access to the interior of the device for wiring purposes. A further plate 67 may be provided and secured to the device by screw or other means, to isolate each partitioned, different service wiring area portion of the device, isolating the cables or wires in one compartment against access as to other than workmen authorized to make connections in that area.

The structure of this invention may be formed of metal, plastics or other suitable material, blanked, stamped or otherwise fabricated of one or more parts to form the same pursuant to the disclosure herein.

The device, as herein described, is adapted for selective passage, through two or more partitioned sections formed therein, of different types or purposes cables; — for example, telephone and power cables, and for separating the sections so receiving said cables so that those who are to work on one type of cable need not expose the other cables of other types. The device may be provided with more than two partitioned sections so formed therein, for isolating more than two types of cables or wires, if so desired.

While the present invention has been particularly set forth in terms of specific embodiments thereof, it will be understood, in view of the instant disclosure, that variations may be made by those skilled in the art within the scope of the invention and disclosure. The invention is thus to be broadly construed within the scope and spirit of the appended claims.

I claim:

1. An insert device for use in connection with a cable source means for passage of cables into the insert device, said source having registration means, said insert device comprising:

a. an insert top assembly having a side wall defining the height of said top assembly, said assembly having an opening therein for passage of cables therethrough, and including plate means at the bottom of said top assembly having means extending upwardly therefrom in spaced relation to the sidewall and offset from the plane of said plate means, for registration with the cable source means, and b. an insert bottom assembly comprising a dividing barrier device for registration with the cable source means for separate passage of the cables therethrough and thence through the insert top assembly.

2. In an insert device for cables as set forth in claim 1, registrable means in the insert assembly formed complementarily to the cable source registration means.

3. In an insert device for cables as set forth in claim 1, the insert top assembly being outwardly flanged to facilitate registration thereof with the cables source means.

4. In an insert device for cables as set forth in claim 1, a cap member secured to said device for closing the top thereof and thus sealing the same.

5. In an insert device for cables as set forth in claim 1, the side wall of the insert top being upwardly and inwardly angled.

6. An insert device for use in connection with a cable source means for passage of cables into the insert device, said source having registration means, said insert device comprising:

a. an insert top assembly having a side wall defining the height of said top assembly, said top assembly having an opening therein for passage of cables therethrough, b. plate means at the bottom of said top assembly having means extending outwardly in spaced relation to said sidewall and offset from the plane of said plate mens, for registration with the cable source means, and c. an insert bottom assembly including an elongated vertical medial partition wall portion contacting the plate means and having portions extending laterally from both sides thereof terminating in flanged portions spaced from the medial partition wall for registration with said cable source means.

7. In an insert device for cables as set forth in claim 6, said insert bottom assembly being formed of J-shaped portions joined to form an inverted T cross-section.

8. In an insert device for cables as set forth in claim 6, said flanged portions of said insert bottom assembly being formed with grommeted edges.

9. In an insert device for cables as set forth in claim 6, said partition portion of said insert bottom assembly defining an elongated dividing post so contacting the insert top assembly, and a plate secured to said post and extending outwardly from one side of said post and adjacent the upper end thereof and preventing passage of wires through that side of the insert bottom assembly.

10. An insert device for use in connection with a cable source means for passage of cables into the insert device, said source having registration means, said insert device comprising a. an insert top assembly having a side wall defining the height of said top assembly and having an opening for passage of cables therethrough, said top assembly being complementarily registrable with an upper portion of said cable source, b. plate means at the bottom of said top assembly having means extending outwardly in spaced relation to said sidewall and offset from the plane of said plate means, for registration with the cable source means, said plate means including apertures forming a separating and passage means for the cables passing through the device, and c. an insert bottom assembly including an elongated vertical medial partition wall portion contacting the plate means and having portons extending laterally from both sides thereof terminating in flanged portions spaced from the medial wall partition wall for registration with said cable source means.

11. In an insert device for cables as set forth in claim 10, further including a second separating means for cables passing through the device comprising a further partition formed in said insert device and complementary to the said partition wall portion, defining therewith a separate service wiring area portion of the device.

12. In an insert device for use in connection with a cable source as set forth in claim 10, a pair of insert side plates of outline complemental to the cable source, adapted to be positioned between said side walls of the cable source, with said insert top and bottom assemblies positioned therebetween.

13. In an insert device for use in connection with a cable source as set forth in claim 12, side flanges on said insert side plates, complemental to the cable source.

14. In an insert device for use in connection with a cable source as set forth in claim 12, bottom flanges on said insert side plates, complemental to the cable source.

* * * * *